United States Patent [19]

Isom

[11] 3,986,802
[45] Oct. 19, 1976

[54] MEANS FOR CURING AND MOLDING SOLID RUBBER TIRES

[75] Inventor: Edgar B. Isom, Tuscumbia, Ala.

[73] Assignee: H & H Rubber Company, Inc., Tuscumbia, Ala.

[22] Filed: Sept. 29, 1975

[21] Appl. No.: 617,379

Related U.S. Application Data

[63] Continuation of Ser. No. 446,810, Feb. 28, 1974, abandoned.

[52] U.S. Cl. .................................. 425/35; 425/40; 425/46
[51] Int. Cl.² ........................................ B29H 5/02
[58] Field of Search .................. 425/39, 40, 42, 46, 425/47, 35, 37

[56] References Cited
UNITED STATES PATENTS

| 1,482,325 | 1/1924 | Shively | 425/40 X |
| 1,779,396 | 10/1930 | Keller | 425/47 X |
| 2,834,984 | 5/1958 | Robbins | 425/40 X |
| 2,871,514 | 2/1959 | White | 425/42 X |
| 3,358,330 | 12/1967 | Pacciarini et al. | 425/39 |
| 3,713,929 | 1/1973 | Bottasso et al. | 425/42 X |

Primary Examiner—J. Howard Flint, Jr.
Attorney, Agent, or Firm—C. A. Phillips

[57] ABSTRACT

A method and means of curing a solid rubber vehicle tire in which a mass of uncured rubber is attached to the outside of a rim, the rim placed in a mold, and heat applied to the rim causing heat to permeate outward through the rubber, producing a gradient of hardness wherein maximum hardness occurs in the rubber adjacent to the rim and thus where the rubber adheres to the rim. This is accomplished by means of two plates which form, with the rim, a sealed cavity interior of the rim to which cavity steam is applied.

2 Claims, 2 Drawing Figures

MEANS FOR CURING AND MOLDING SOLID RUBBER TIRES

This is a continuation of application Ser. No. 446,810, filed 2/28/74, now abandoned.

BACKGROUND OF THE INVENTION

1. Field of the Invention

This invention relates to the manufacture of solid rubber tires and particularly to an improved means of curing the rubber.

2. General Description of the Prior Art

Solid rubber tires are widely used on industrial vehicles. A typical such vehicle is a forklift truck employed to stack, unstack, and move all types of materials. The manufacture of solid rubber tires is a substantial business because of the number of such vehicles and because the severe usage to which the tires are put causes them to have a relatively short life requiring frequent replacement. Heretofore and in accordance with present practices, excluding the method and means determined by the applicant as herein described, the curing of the rubber as solid rubber tires are molded has been accomplished by applying heat to the outer or peripheral portion of a mold causing a inward migration, and thus dissipation, of heat with the result that maximum hardness of the rubber is produced at the outer surface with minimum hardness being achieved in the region where the rubber bonds to the rim.

SUMMARY OF THE INVENTION

It is the object of this invention to provide a more durable tire, and in doing so, the applicant has determined a new means of solid tire manufacture. It is a further object of this invention to reduce the curing time, and thus cost, of tire production. In accordance with the applicant's discovery, he determined that the principal cause of deterioration and destruction of solid tires conventionally manufactured was that there was a severe lack of firmness of the rubber adjacent the rim thus permitting it to tear away from the rim. He then determined that the basic process of curing from outside to inside was probably at fault and confirmed this by changing the method of manufacture and means for doing same to that which follows. After applying a selected mass of uncured rubber around a rim of a desired size, the thus formed tire blank, as it is usually called, is placed in an improved mold assembly wherein heat is applied to the rim. As a result, the heat first strikes the rubber adjacent to the rim and then migrates outward through the rubber to the outer periphery of the rubber with, of course, maximum heat being experienced by the region adjacent to the rim with some gradual decrease of heat when measured radially from the rim outward through the rubber. Heat is maintained in a temperature range of 225° to 400° for a curing period of ½ to 4 ½ hours. Alternately, heat is also applied to the periphery of the tire causing curing to proceed by virtue of both inward and outward heat migration which enables curing time to be reduced by approximately one-third, and at the same time, enabling a desired higher degree of hardness to be achieved adjacent to the rim. By virtue of the decreasing temperature gradient outward from the rim, there is produced a hardness contour which is maximum in the vicinity of the rim and decreases to a condition of essentially minimum hardness at the outer periphery of the tire. This, it has been found, is a desired result, enabling maximum "give" on the outer surface of the tire where it strikes objects and uneven floor surfaces, and with minimum "give" at the rim where it is desired that a very firm condition exists to achieve maximum bond to the rim.

DETAILED DESCRIPTION OF THE DRAWINGS

Figure 1:
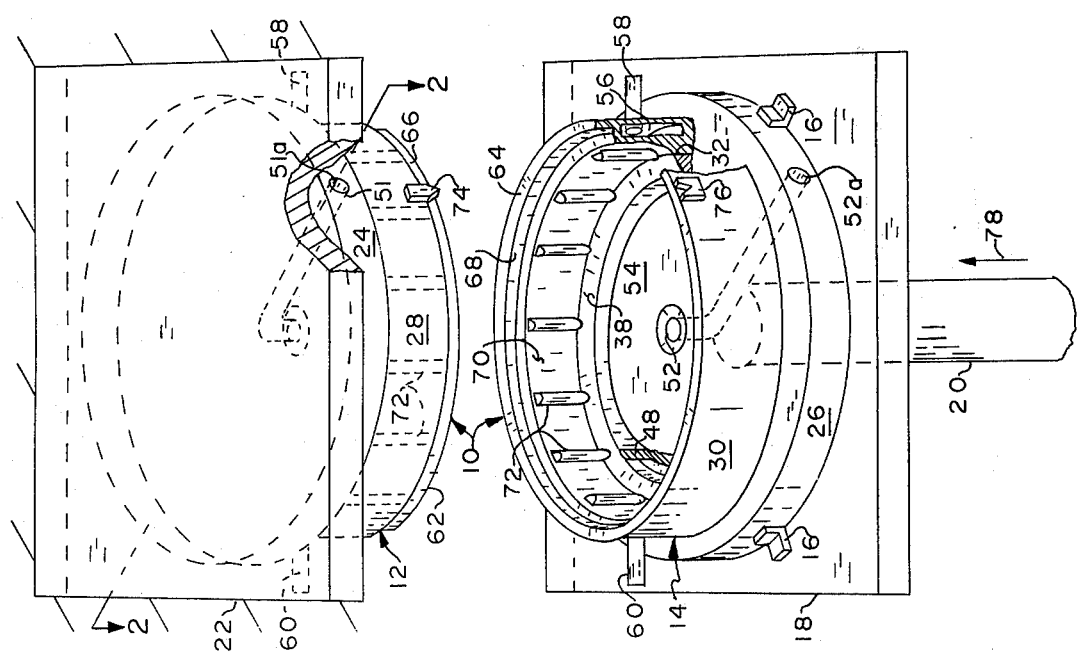
FIG. 1 is an exploded perspective view of an embodiment of the invention.

Referring to the drawings, FIG. 1 shows a two-part tire mold 10, constructed in accordance with the invention, and which consists of an upper and lower half 12 and 14, respectively. The lower half 14 of mold 10 is centrally secured by brackets 16 to lower platen 18 of a conventional hydraulic press, not shown. Platen 18 is mounted upon a ram 20 which is operated by the press, and is shown in a retracted or lowered position. The upper half 12 of mold 10 is secured in a similar manner to stationary upper platen 22. Each half 12 and 14 of mold 10 is of similar construction and includes circular base plates 24 and 26, respectively, to which annular shells 28 and 30, respectively, are removably attached. Each of base plates 24 and 26 is provided with a circular shoulder 32, the outer periphery 34 (FIG. 2) of which is dimensioned to detachably accept the inner peripheral edge 36 of each of outer mold shells 28 and 30.

Circular shoulder 32 forms the outer terminus of an inclined planar surface 38 which extends inward to connect with a circular notch 40 formed in each of base plates 24 and 26 which notch is dimensioned to receive a circular band or steel wheel rim 42 (FIG. 2) to which a mass 44 of uncured rubber has been affixed. This combination is commonly referred to as a tire blank, which is designated 45. The inwardly disposed periphery 46 of notch 40 extends above the surface of plates 24 and 26 to form a second raised shoulder 48 which is adapted to support metal rim 42 in a position concentric to outer shells 28 and 30.

Figure 2:
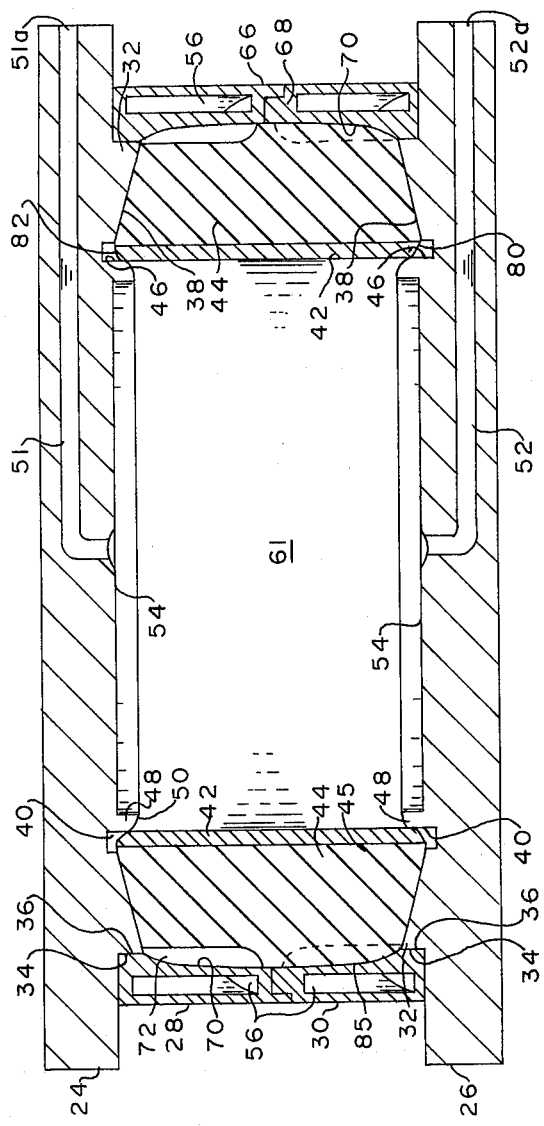
FIG. 2 is a sectional view along lines 2—2 of FIG. 1 to which has been added a sectional view of a solid rubber tire in the process of being molded.

Rim contacting edge 50 (FIG. 2) of circular inner shoulder 48 is chamfered to facilitate correct initial engagement between steel rim 42 and shoulder 48 when mold halves 12 and 14 are being engaged. Steam lines 51 and 52 in base plates 24 and 26 provide live steam at a desired temperature to the interior of mold 10. Typically, steam would be applied from steam generator at inlet 51a of line 51 and exhausted through a restricted orifice (not shown) connected to outlet 52a of line 52. Inwardly disposed or circular recess 54 is provided in base plates 24 and 26, and with respect to base plate 26, this recess enables condensed moisture which collects during the curing process to be forced out through steam line 52 formed in base plate 26. Mold shells 28 and 30 together form the periphery of mold 10. To enable curing from the periphery of a tire inward as well as outward to accelerate curing when desired, each is provided with a continuous inner cavity or passageway 56 through which a heated medium such as steam may be passed through inlet and outlet lines 58 and 60, respectively. Alternately, when heat is to be applied only to the inner cavity 61 of mold 10, passageway 56 may be omitted. Inward contiguous edge regions 62 and 64 of shells 28 an 30 are formed with interlocking flanges 66 and 68 which are adapted to support upper and lower halves 12 and 14, respectively, of mold 10 in a precise concentric relationship when pressed together as shown in FIG. 2. The concave inner surface 70 of each shell is equipped with tread-forming lugs 72 which extend transversely from inclined surfaces 38 of the base plates to a point near mating flanges 66 and 68, being of a thickness and width to form a tread of a predetermined depth and spacing. Alternately, a no-tread design would be employed to achieve a smooth tire.

Upper and lower shells 28 and 30 are relatively oriented such that lugs 72 of one shell are transversely positioned at a point midway between tread lugs 72 of the opposite shell, being rotationally supported in this position by mating-tapered insert 74 and socket 76, attached to the outer periphery of upper and lower shells 28 and 30, respectively.

In operation, a mass of rubber 44 to be cured and tempered to form a solid-type rubber tire 45 is placed in lower half 14 of mold 10 when in retracted position as shown in FIG. 1. The press is then energized to apply an upward force to ram 20 as indicated by arrow 78 to compress the blank tire 45 between halves 12 and 14 wherein steel rim 42 is supported as shown in FIG. 2 with the opposed edges 80 and 82 inserted in the opposed notched regions 40 and being concentrically supported by inner collar 48. Inclined surface 38 of each of circular support plates 24 and 26 is in contacting engagement with the opposing sides of rubber tire 45 and the outer peripheral surface of tire 45 is forced into high-pressure contact with the inner peripheral surfaces 70 of shells 28 and 30. A seal is thus formed at the outer edges 80 and 82 of rim 42, forming a closed chamber 61 in the interior region of rim 42 as closed by plates 24 and 26. Steam is then injected through inlet 51a of line 51 to cavity 61. Steam is bled through outlet 52a at a rate sufficient to maintain a desired temperature in cavity 61. As a result, a desired heat is applied to rim 42. In this manner, heat permeates tire 45 from the inside and thus cures the tire from the inside toward its outer surface 85, producing a decreasing hardness gradient toward the outer surface. If so desired, curing time may be shortened by heating outer mold shells 28 and 30. This is accomplished by applying steam through inlet 58 of each of shells 28 and 30. Steam flow is then through continuous cavities 56 and outlet 60 which would be connected common to outlet 52a or otherwise connected to achieve a restricted flow to maintain a selected temperature and pressure in the outer mold shells. In this manner, the tire 45 is cured to essentially an equal hardness throughout. During curing, the pressure in mold chamber 61 causes the shells to slightly separate, enabling air to be expelled and a small amount of rubber to be expelled which is a visual indication that the mold is properly filled with rubber.

Shells 28 and 30 may be detachable and may be of selected widths to accommodate rims 42 of varying widths and also provide different tread sculptures.

Typically, the temperature of steam applied would be in the range of 225° F. to 400° F., and the curing time, with steam applied, would be in the range of ½ to 4½ hours, depending upon the size and shape of the tire and whether both outside and inside curing is employed. The time required is approximately half of that typically required using the old method of applying heat from inside in. More important, the body and bond of the tire is improved because of the hardness gradient, the tire being of harder consistency in the region of the rim and of decreasing hardness from this region outward to the periphery of the tire. Further, by this method, guesswork is taken out of determining the hardness or durometer characteristic of a tire so that it will be known that the tire will be harder inside than outside, the outside being readily observable thus will be known that the desired hardness exists interior of the tire. As suggested above, both an outside and inside curing heat may be applied to further reduce curing time and will achieve a tire with an improved hardness characteristic over that of employing outer applied heat alone as is conventionally the case.

What is claimed is:

1. A tire molding machine for curing and molding a solid rubber tire from a tire blank, the tire blank consisting of an annular rim having two exposed outer opposite side edges and a mass of uncured rubber around the outer periphery of the rim, the machine comprising:
   an outer annular shell having opposite outer side edge surfaces and a peripheral inner surface, the latter adapted to support, encase, and form the periphery of the mass of uncured rubber of said blank;
   a first side closing plate member closing one side of said shell and having a first annular mating surface adapted to sealably engage one side edge surface of said shell, a second annular mating surface comprising a notch adapted to sealably engage a side edge of the rim of said blank when in place in said machine, and hot vapor entrance means comprising a vapor line radially interior of said second annular mating surface, said line extending from inside to outside of said plate member for introducing a hot vapor;
   a second side closing plate member closing the opposite side of said shell and having a first mating surface adapted to sealably engage the opposite side edge surface of said shell, a second annular mating surface comprising a notch adapted to sealably engage the opposite side edge of its rim of a tire blank, and hot vapor exit means comprising a vapor line radially interior of said last-named second annular mating surface, said line extending inside to outside of said second closing plate member for discharging a hot vapor; and
   closing means for selectively applying a force between said first and second side closing plate members, whereby said first and second side closing plate members may be selectively held in a closed configuration and said side closing members integrally forming the sides of a tire and providing a sealed cavity radially interior of the rim of a tire blank, whereby hot vapor pressure is directly and uniformly applied to the entire surface of said rim by passing a hot vapor through said cavity.

2. A tire molding machine as set forth in claim 1 wherein said annular shell includes an annular cavity, and said machine further comprises means for applying a heated vapor to said annular cavity, whereby heat may be applied to the outer periphery of said blank as well as to the inner periphery of rubber of said blank.

* * * * *